US008889467B2

(12) United States Patent
Duerr et al.

(10) Patent No.: US 8,889,467 B2
(45) Date of Patent: Nov. 18, 2014

(54) METHOD OF OPTIMIZING THE BAND EDGE POSITIONS OF THE CONDUCTION BAND AND THE VALENCE BAND OF A SEMICONDUCTOR MATERIAL FOR USE IN PHOTOACTIVE DEVICES

(75) Inventors: Michael Duerr, Stuttgart (DE); Silvia Rosselli, Stuttgart (DE); Gabriele Nelles, Stuttgart (DE); Akio Yasuda, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 364 days.

(21) Appl. No.: 13/273,715

(22) Filed: Oct. 14, 2011

(65) Prior Publication Data

US 2012/0034732 A1 Feb. 9, 2012

Related U.S. Application Data (63) Continuation of application No. 12/280,359, filed as application No. PCT/EP2006/012342 on Dec. 20, 2006, now abandoned.

(30) Foreign Application Priority Data

Feb. 22, 2006 (EP) .................................. 06003636

(51) Int. Cl.
*H01L 21/00* (2006.01)
*H01G 9/20* (2006.01)
(52) U.S. Cl.
CPC ............. *H01G 9/2036* (2013.01); *Y02E 10/542* (2013.01)
USPC ........................................................ 438/93

(58) Field of Classification Search
CPC ... H01G 9/2036; H01L 51/422; H01L 51/4226; H01L 51/4233
USPC .......................................................... 438/93
See application file for complete search history.

(56) References Cited

U.S. PATENT DOCUMENTS

| 6,034,202 | A | * | 3/2000 | Aharoni et al. ............... 528/279 |
| 2002/0132733 | A1 | * | 9/2002 | Labarge et al. ............... 502/325 |
| 2003/0201010 | A1 | * | 10/2003 | Koyanagi et al. ............. 136/263 |
| 2004/0197549 | A1 | * | 10/2004 | Inokuma et al. .............. 428/325 |
| 2004/0251508 | A1 | * | 12/2004 | Tomita ......................... 257/432 |
| 2005/0150545 | A1 | | 7/2005 | Choi et al. |
| 2005/0270357 | A1 | * | 12/2005 | Kawai ........................... 347/105 |

FOREIGN PATENT DOCUMENTS

| EP | 1513171 A1 * | 3/2005 |
| EP | 1 542 249 | 6/2005 |

OTHER PUBLICATIONS

Kitiyanan et al., "The use of binary TiO2—GeO2 oxide electrodes to enhanced efficiency of dye-sensitized solar cells," Journal of Photochemistry and Photobiology A: Chemistry, 179 (2006) 130-134.*
Zhang et al., Applied Catalysis A: General, 284 (2005) pp. 193-198.*

(Continued)

*Primary Examiner* — Eli Mekhlin
(74) *Attorney, Agent, or Firm* — Oblon, Spivak, McClelland, Maier & Neustadt, L.L.P.

(57) ABSTRACT

The present invention relates to a semiconductor compound having the general formula $A_xB_{1-x}C_y$, to a method of optimizing positions of a conduction band and a valence band of a semiconductor material using said semiconductor compound, and to a photoactive device comprising said semiconductor compound.

33 Claims, 6 Drawing Sheets (56) References Cited

OTHER PUBLICATIONS

Menzies et al., Journal of Sol-Gel Science and Technology, 32 363-366, 2004.

Kitiyanan, A. et al., "The Preparation and Characterization of Nanostructured $TiO_2$—$ZrO_2$ Mixed Oxide Electrode for Efficient Dye-Sensitized Solar Cells", Journal of Solid State Chemistry, vol. 178, No. 4, pp. 1044-1048 (2005).

Ko, K.H. et al., "Enhanced Efficiency of Dye-Sensitized $TiO_2$ Solar Cells (DSSC) by Doping of Metal Ions", Journal of Colloid and Interface Science, vol. 283, pp. 482-487 (2005).

* cited by examiner

METHOD OF OPTIMIZING THE BAND EDGE POSITIONS OF THE CONDUCTION BAND AND THE VALENCE BAND OF A SEMICONDUCTOR MATERIAL FOR USE IN PHOTOACTIVE DEVICES

CROSS-REFERENCE OF RELATED APPLICATIONS

This application is a continuation of application Ser. No. 12/280,359, filed on Oct. 31, 2008 (now abandoned), the entire contents of which are incorporated herein by reference, and which is a 371 national stage of International Application No. PCT/EP06/12342, filed Dec. 20, 2006. This application also claims foreign priority to European Patent Application 06003636.5, filed Feb. 22, 2006.

BACKGROUND OF THE INVENTION

1. Field of the Disclosure The present invention relates to a semiconductor compound having the general formula $A_xB_{1-x}C_y$, to a method of optimizing positions of a conduction band and a valence band of a semiconductor material using said semiconductor compound, and to a photoactive device comprising said semiconductor compound.

2. Description of the Related Art

Figure 1:
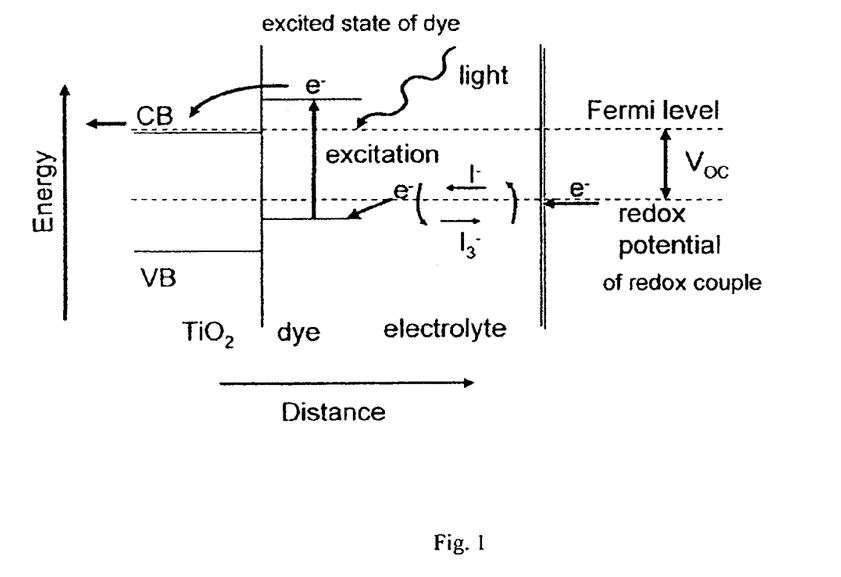
FIG. 1 shows the schematics of the energy levels in a DSSC under illumination. $V_{OC}$ is determined by the band edge of the conduction band (CB) and the redox potential of a redox-couple as charge mediator, e.g. $I^-I^-_3$. VB denotes the valence band of the semiconductor.

Photoelectrochemical cells based on sensitisation of nanocrystalline $TiO_2$ by molecular dyes (so called dye-sensitised solar cells, DSSC) have been first reported by B. O'Regan and M. Grätzel, Nature 353 (1991) 737; WO 91/16719 [1] and have been continuously improved over the last decade. In operation, absorption of a photon leads to the excitation of an electron, which is then injected from the dye molecule into the conduction band of the $TiO_2$ and transported to the front electrode. The dye molecule is regenerated from a platinum counter electrode via a redox couple in electrolyte. Most crucial for a further success of dye-sensitised solar cells is to increase their power conversion efficiency. It depends on short circuit current density $J_{SC}$, fill factor FF, and the open circuit voltage $V_{OC}$. $J_{SC}$ depends among others, on the number of absorbed photons and the efficiency to convert those absorbed photons into photoelectrons. FF mainly depends on the conductivity of the materials in use. $V_{OC}$ is dependent on both the energy difference between the conduction band of the semiconducting material and the redox potential of the redox couple as well as the recombination rate of electrons from the semiconductor into the electrolyte (FIG. 1). Most effort has been taken in the past to increase $J_{SC}$ by means of different dye molecules and light management. $V_{OC}$ was increased by means of co-adsorption of smaller molecules together with the dye molecules to suppress recombination. No improvement by changing the semiconductor material or the redox-couple has been reported. Core-shell structures with oxide materials other than $TiO_2$ on the surface of the $TiO_2$ particles partly increased the efficiency ([2] Y. Diamant, S. Chappel, S. G. Chen, O. Melamed, A. Zaban, Coordination Chemistry Reviews 248, 1271 (2004)) but must be regarded as another way of surface treatment.

SUMMARY

The main disadvantage of the state of the art DSSC is the low power conversion efficiency when compared with other, well-established solar cell technologies. As described above, the three main parameters to be improved are short circuit current density $J_{SC}$, fill factor FF, and the open circuit voltage $V_{OC}$. Little innovation has been reported with respect to the latter one since the advent of DSSC. This is especially true with respect to the nanoporous semiconductor material, which is in almost all cases $TiO_2$. ZnO has been used as a substitute mainly due to the possibility to grow ZnO at low temperatures, but lower $V_{OC}$ and minor efficiencies have been obtained when compared to $TiO_2$ ([3] K. Keis, E. Magnusson, H. Lindström, S.-E. Lindquist, A. Hagfeldt, Sol. Energy Mat. Sol. Cells 72, 51 (2002)).

There have been reports on $TiO_2$ electrodes which have been coated with a thin layer of various wide band gap materials so as to form core-shell-structures. Such core-shell-structures as reported by Diamant et al. (see above) were prepared by electrochemical deposition of the shell material on the core material or by dipping the core electrode (usually the $TiO_2$ electrode) into a solution containing a precursor of the respective shell material. In such core-shell-structures, the shell-materials only form a thin coating on the $TiO_2$ core particle [2] (see above). The idea behind such a core-shell-structure is to avoid recombination processes between the photo-injected electrons in the semiconductor and the oxidized ions in the redox mediator or oxidized dye at the semiconductor's surface. In such a core-shell-structure, the recombination processes can possibly be slowed down by the formation of an energy barrier at the $TiO_2$ surface. However, the influence on the overall DSSC characteristics, for example $J_{SC}$, FF, and $V_{OC}$ is limited, and furthermore, such core-shell-particles are subject to faster degradation.

Furthermore, $J_{SC}$ can also be improved by changing the properties of the semiconductor material. As an example, dyes with a different absorption spectrum which could otherwise not be used in the DSSC, e.g. because their LUMO (where LUMO stands for lowest unoccupied molecular orbital) is too low to inject excited electrons into the conduction band of the semiconductor material, can be used when the conduction band edge of the semiconductor material is lowered.

Accordingly, it was an object of the present invention to provide for a dye-sensitized solar cell of which the energy efficiency is at least comparable to the energy efficiency of a dye-sensitised solar cell as reported in the prior art. More specifically, it was one object of the present invention to improve the open circuit voltage $V_{OC}$ of a dye-sensitised solar cell.

The objects of the present invention are solved by method of optimizing positions of a conduction band and a valence band and/or the energy difference between a conduction band and a valence band of a semiconductor material in a semiconductor layer of a photoactive device, preferably a dye-sensitised solar cell having a dye in said semiconductor layer, and/or of optimizing an open circuit voltage of said device, preferably of said dye-sensitised solar cell, using a semiconductor compound having a formula $A_xB_{1-x}C_y$, wherein A and B are metals or metalloids, and wherein C is a non-metal or a metalloid, preferably selected from the group comprising C, N, O, P, S, Se, As, $NO_2$, $NO_3$, $SO_3$, $SO_4$, $PO_4$, $PO_3$, $CO_3$, x is in the range of from 0.001 to 0.999 and y is in the range of from 0.1 to 10.

In one embodiment said semiconductor compound has an upper edge of a valence band and a lower edge of a conduction band, wherein said upper edge of said valence band is between an upper edge of a valence band of a first semiconductor compound $AC_v$ and an upper edge of a valence band of a second semiconductor compound $BC_z$, and said lower edge of said conduction band of said semiconductor compound is between a lower edge of a conduction band of said first semiconductor compound $AC_v$ and a lower edge of a conduction band of said second semiconductor compound $BC_z$, wherein A and B are metals or metalloids, and wherein v and z are in the range of from 0.1 and 10, and wherein y in said semiconductor compound having the formula $A_xB_{1-x}C_y$ is $y=(1-x)*z+x*v$.

Preferably, A and B are metals or metalloids selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, $SrCu_2$.

In one embodiment C is O, said semiconductor compound thus being a mixed semiconductor oxide.

In one embodiment said semiconductor compound is synthesized starting from at least two precursor compounds, preferably metal isopropoxides of the general formulae $A_u(iPrO)_w$ and $B_s(iPrO)_t$, wherein A and B are metals or metalloids selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, $SrCu_2$, and s, u, t and w are in the range of from 1 to 10, and (iPrO) is an isopropoxide-group.

In one embodiment, said semiconductor compound is synthesized starting from three, four or more different precursor compounds, preferably metal isopropoxides as defined above.

In one embodiment $AC_v$ and $BC_z$ are independently selected from the group comprising $TiO_2$, $SnO_2$, ZnO, $Nb_2O_5$, $ZrO_2$, $CeO_2$, $WO_3$, $Cr_2O_3$, $CrO_2$, $CrO_3$, $SiO_2$, $Fe_2O_3$, CuO, $Al_2O_3$, $CuAlO_2$, $SrTiO_3$, $SrCu_2O_2$, ZrTiO4.

It should be noted that other than the compounds defined by $A_xB_{1-x}C_y$, semiconductor compounds in accordance with the present invention may also have the formula $A_{x1}B_{x2}C_{x3}...X_{xn}$, having a number n of elemental components A, B, ... X, wherein n>3, and each of x1 to xn is in the range of from 0.001 to 0.999. Hence, in such compounds there may be more than three elemental components, such as 4, 5, 6 or 7. In compounds in accordance with this embodiment, the ratio between the respective components A, B, C, ..., X is chosen such to adjust and/or optimise the band edge positions of the semiconductor compound in accordance with the aforementioned requirements, and is optimized as described further below. In compounds in accordance with this embodiment, A, B, C, ... X are metals or metalloids or non-metals, wherein the metals or metalloids are selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, $SrCu_2$, and wherein the non-metals are selected from the group comprising C, N, O, P, Se, As, $NO_2$, $NO_3$, $SO_3$, $SO_4$, $PO_4$, $PO_3$, $CO_3$, with the proviso that at least one of A, B, C, ... X is a metal or metalloid as defined above, and at least one of A, B, C, ... X is a non-metal as defined above.

In one embodiment the components A and B are present in said semiconductor compound in a ratio of from 1:1000 to 1000:1.

In one embodiment said semiconductor compound is synthesized starting from an oxide, $A_m$ and a nitrate, $B(NO_3)_q$, A and B are metals or metalloids being selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, $SrCu_2$, and m and q being in the range of from 0.1 to 10, wherein said oxide and said nitrate have been reacted together, preferably by mixing them, wherein, preferably, after said oxide and said nitrate have been reacted together, the resulting product is sintered, preferably at T>300° C.

In one embodiment said semiconductor compound is synthesized by a process comprising the steps: mixing and reacting at least two precursor molecules, preferably metal isopropoxides of the general formulae $A_u(iPrO)_w$ and $B_s(iPrO)_t$, wherein A and B are metals or metalloids selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, $SrCu_2$, s, u, t and w are in the range of from 0.1 to 10, and (iPrO) is an isopropoxide-group, preferably in a ratio in which said metals are desired to be present in the resulting compound, heating the resulting mixture, optionally in the presence of an acid, to a temperature between 50° C. and 300° C. for a period of time between 1 h and 20 h, filtering the product to obtain said semiconductor compound as a residue, or, alternatively, reacting an oxide, $AO_m$, and a nitrate, $B(NO_3)_q$, A and B being as defined before, and m and q being in the range of from 0.1 to 10, sintering the resulting product at a temperature >300° C., for a period of 10 minutes to 60 minutes, preferably at a temperature >400° C. for approximately 30 minutes.

In one embodiment said semiconductor compound is incorporated in said semiconductor layer of said device as semiconductor particles having an average diameter ≤1 μm, preferably ≤500 nm, more preferably ≤100 nm, wherein, preferably, said semiconductor particles have an outer shell made of the same and/or a further semiconductor compound, preferably a semiconductor oxide.

In one embodiment said semiconductor particles have a shape selected from the group comprising rods, tubes, cylinders, cubes, parallelipeds, spheres, balls and ellipsoids.

Preferably, said semiconductor particles are a mixture of at least two kinds of particles differing in their average diameter or length, and/or differing in their composition.

In one embodiment said semiconductor particles are a mixture of a first kind of particles and a second kind of particles, said first kind of particles having an average diameter or length in the range of from 1 nm to 30 nm, and said second kind of particles having an average diameter in the range of from 50 nm to 500 nm and/or length in the range of from 50 nm to 5 μm.

In one embodiment said semiconductor particles are a mixture of a first kind of particles and a second kind of particles, said first kind of particles being made of a first semiconductor compound $A_xB_{1-x}C_y$ as defined above, with C being O, and said second kind of particles being made either of a second semiconductor compound $A_xB_{1-x}C_y$ as defined above, with C being O, or of any semiconductor oxide as defined in claim 7 with respect to $AC_v$ and/or $BC_z$ and wherein said first semiconductor compound and said semiconductor compound may be the same or different.

Preferably, said semiconductor layer has pores having a diameter in the range ≤1 μm, preferably in the range of from 1 nm to 500 nm, more preferably in the range of from 10 nm to 50 nm.

In one embodiment said semiconductor particles, during manufacturing of said device, preferably said dye-sensitised solar cell (DSSC), are applied via screen printing, doctor blading, drop casting, spin coating, inkjet printing, electrostatic layer-by-layer self-assembly, lift-off-process, mineralization process or anodic oxidation.

Preferably, said semiconductor material is chosen such that it has an upper edge of a conduction band which is below or equal to a photo-excited state of said dye to allow electron injection from said dye into said conduction band upon photo-excitation of said dye, but which upper edge is between the upper edges of conduction bands of $AC_v$ and $BC_z$ as defined in any of claims 2-11.

Preferably said optimizing is a widening or narrowing of said energy difference between said conduction band and said valence band of said semiconductor material or is a shift in the position of a band gap between said conduction band and said valence band.

In one embodiment said optimizing is with respect to a photoexcited state of said dye, so as to enable electron injection from said photoexcited state into said conduction band of said semiconductor material, and is furthermore with respect to the redox potential of a redox couple present in said dye-sensitised solar cell (DSSC).

The objects of the present invention are also solved by a photoactive device, which is not an inorganic solar cell, said photoactive device comprising a semiconductor layer having as semiconductor material a semiconductor compound as defined above, preferably a mixed semiconductor oxide as defined in claim 4, wherein, preferably, the photoactive device is optimized by the method according to the present invention.

The objects of the present invention are also solved by a photoactive device, preferably a dye-sensitised solar cell (DSSC), comprising a semiconductor layer having as semiconductor material a semiconductor compound as defined above, preferably a mixed semiconductor oxide as defined in claim 4, wherein, preferably, the photoactive device is optimized by the method according to the present invention.

In one embodiment, said photoactive device is not an inorganic solar cell.

Preferably, the photoactive device according to the present invention further comprises a dye in said semiconductor layer and is further characterized in that the conduction band of said semiconductor material has been adjusted with respect to the excited state of said dye to ensure an efficient electron injection from the excited state of said dye to the conduction band of said semiconductor material, whilst making the upper edge of said conduction band of said semiconductor material to be as close as possible to said excited state of said dye.

In one embodiment the photoactive device according to the present invention is a device selected from the group comprising dye-sensitised solar cells, photoactive catalysts, self-cleaning windows, and water purification systems.

The present inventors have found that it is possible to optimize the open circuit voltage of a dye-sensitised solar cell by using said new semiconductor material in the active layer, i.e. the new semiconductor layer participating in the electron transport within the solar cell. The new semiconductor material $A_xB_{1-x}C_y$ has different physical and chemical characteristics, such as band gap, band edge positions, composition etc, in comparison to the at least two different semiconductor compounds $AC_y$ and $BC_z$ on their own.

In many instances, in the present application, reference is made to an "energy difference between a conduction band and a valence band of a semiconductor material". This term as used herein, is to be equated with the term "band gap".

Sometimes, in this application, reference is also made to a "conduction band edge" which is meant to signify the lowest energy level of the conduction band of a given semiconductor material. Analogous, the "valence band edge" is meant to signify the highest energy level of the valence band of the respective semiconductor material.

Sometimes, in this application, reference is made to "positions of a conduction band and a valence band" which is meant to signify the positions of the respective edges of the respective bands. The term "semiconductor material" is meant to signify any material having one or several semiconductor compounds in it. The term "semiconductor compound", as used herein, is meant to signify a chemical compound having semiconducting qualities. The term "mixed semiconductor oxide", as used herein, is meant to signify a semiconductor oxide in accordance with the present invention, of the formula $A_xB_{1-x}C_y$, wherein C is O (oxygen). The symbols A, B and C are variables for which a number of chemical elements can be substituted, as further specified and defined above. The symbols O, S, As, Cr, Ti, Sn, Nb, Cn, Ce, W, Si, Al, Cu, Sr, etc. are the chemical elemental symbols as used in the periodic table and refer to the respective chemical element.

It should be noted that other than the compounds defined by $A_xB_{1-x}C_y$, semiconductor compounds in accordance with the present invention may also have the formula $A_{x1}B_{x2}C_{13}...X_{xn}$, having a number n of elemental components A, B, ... X, wherein n≥3, and each of x1 to xn is in the range of from 0.001 to 0.999. In this case, the symbols A, B, C, ... X are variables for which a number of chemical elements can be substituted, as further specified and defined in the respective paragraph on $A_{x1}, B_{x2}, C_{x3}$ above.

As used herein, the term "metalloid" refers to an element the properties of which are intermediate between metals and non-metals. More specifically, a "metalloid" which is sometimes also called "semi-metal", has the physical appearance and properties of a metal but behaves chemically like a non-metal. The known metalloids include B, Se, Ge, Si, As, Sb, Te and Po.

The term "dye-sensitised solar cell" (DSSC), as used herein, refers to a solar cell, wherein the light absorption capabilities have been improved by the presence of a dye in the photoactive layer. The "dye-sensitised solar cells" in accordance with the present invention are so-called "hybrid devices" in that their photoactive layer contains both inorganic and organic materials which take part in the charge generation and transporting processes. A solar cell in accordance with the present invention is not an inorganic solar cell. This term "inorganic solar cell" is used herein in reference to a solar cell which has a photoactive layer consisting exclusively of inorganic material. Hence, a "dye-sensitised solar cell" according to the present invention always is a "hybrid solar cell" and is not an inorganic solar cell as defined above.

It should be noted that the term "optimization" as used in the present application may imply a widening or a narrowing and/or shifting of the absolute position of a band gap. If a dye is present, "optimization" may imply adjusting of the respective properties of the semiconductor material for the actual dye used. Taking a dye-sensitised solar cell as an example, the reference point of such optimization is a comparable dye-sensitised solar cell, wherein, in the active semiconductor layer, there is not a semiconductor material according to the present invention present, but only a semiconductor compound made of less constituents than said new semiconductor material present. It is with respect to this one compound that the band gap is optimised, i.e. narrowed or widened or the absolute position shifted, as the case may be. The inventors have found that, in particular semiconductor oxides are particularly useful for creating such a new semiconductor, i.e. an entirely different compound, in accordance with the present invention. In this respect, it should be noted that, more specifically, the term "mixed oxide" as used herein refers to the result of fabricating a new semiconductor compound $A_xB_{1-x}C_y$ according to the present invention, with C being oxygen. Such mixed oxide has different physical characteristics, such as band gap and/or band edge positions, in comparison to the semiconductor oxides $AC_y$ and $BC_z$ on their own.

In many instances, in the present application, reference is made to particles having an average diameter or length <1 μm, preferably ≤500 nm, more preferably ≤100 nm. These particles are also herein sometimes being referred to as "nanoparticles". In a preferred embodiment, such "nanoparticles"

have an average diameter or length ≤300 nm. In a particularly preferred embodiment, they have an average diameter or length in the range of from 10 nm to 50 nm.

In the present application, sometimes also reference is made to pores having an average diameter in the range <1 μm, preferably in the range of from 1 nm to 500 nm, more preferably in the range of from 10 nm to 50 nm. Such pores <1 μm are herein also sometimes referred to as "nanopores".

In a preferred embodiment, the new semiconductor compound is the result of combining the precursors for $TiO_2$ and $ZrO_2$ and the dye used is red-dye-bis-TBA (cis-bis (isothiocyanato) bis (2,2'-bipyridyl-4,4'-dicarboxylato)-ruthenium (II) bis-tetrabutylammonium). The mixture ratio of Ti:Zr in the semiconductor compound according to the present invention is 1000:1-1:1000, preferably approximately 200:1-10:1, more preferably approximately 99:1. Exemplary compounds in accordance with the present invention are $Ti_{0.8} Zr_{0.2} O_2$, $Ti_{0.9} Zr_{0.1} O_2$ and $Ti_{0.99} Zr_{0.01} O_2$.

The various application techniques by which the semiconductor particles are applied, as e.g. referred to in claim 19, are known to someone skilled in the art. The lift-off process is e.g. described in EP 04009742.0 and EP 04009743.8, both filed on Apr. 23, 2004, the contents of which is incorporated in its entirety by reference thereto.

Figure 2:
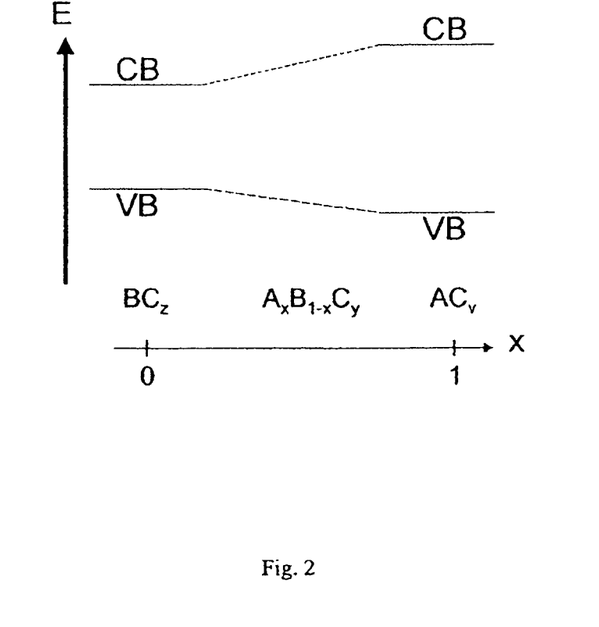
FIG. 2 shows a schematic description of the dependence of the energetic positions of valence band edge and conduction band edge on atomic composition of the semiconductor material.

To increase the efficiency of DSSC towards a value compatible with conventional solar cell techniques, not only $J_{SC}$ and FF, but also $V_{OC}$ has to be increased substantially. To increase open circuit voltage by changing the semiconductor material, the present inventors have found the following: Since $V_{OC}$ is dependent on the difference between conduction band edge of the semiconductor material and the redox potential of the charge mediator (compare FIG. 1), it is possible to increase $V_{OC}$ by raising the conduction band edge of the semiconductor material. However, the energetic level of the conduction band edge also determines the efficiency of electron injection from the dye molecule into the conduction band. It therefore must not lie too high when compared to the excited state of the dye molecule. As a consequence, one cannot expect to find the perfect fit of the conduction band edge position in nature. To adjust and optimise the position of the conduction band edge, the present inventors therefore made use of band-gap engineered semiconductor materials. In one embodiment they used band-gap engineered, synthesised mixed oxides. They allow for the careful adjustment of the band edge energies within some given limits. E.g., when one component A of a binary compound $AC_y$ is in part exchanged by another component B and the two binary components $AC_y$ and $BC_z$ have a different band gap, then the band gap of the ternary component $A_xB_{1-x}C_y$ will change with the amount of A and B in the compound between the values of $AC_y$ and $BC_z$. This is illustrated in FIG. 2. Additionally, for more specific applications, the use of dyes with different absorption spectrum, e.g. longer wavelength region and therefore energetically lower LUMO (where LUMO stands for lowest unoccupied molecular orbital) might be of advantage. To optimise the efficiency of these cells, a mixed oxide with reduced conduction band edge is preferred.

BRIEF DESCRIPTION OF THE DRAWINGS

In the following reference is made to the figures, wherein.

DETAILED DESCRIPTION OF THE EMBODIMENTS

Furthermore, reference is made to the following example which is given to illustrate, not to limit the present invention.

EXAMPLE

Figure 3:
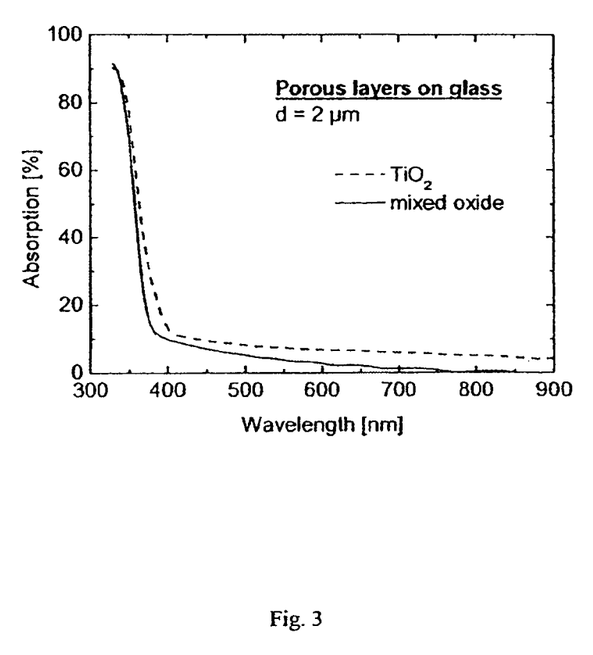
FIG. 3 shows results of absorption measurements with porous layers using an integrating sphere to collect directly transmitted and scattered light. The layers consist either of $TiO_2$ alone (smaller band gap) or of a mixed semiconductor oxide made of $Ti_{0.8}Zr_{0.2}O_2$.
Figure 4:
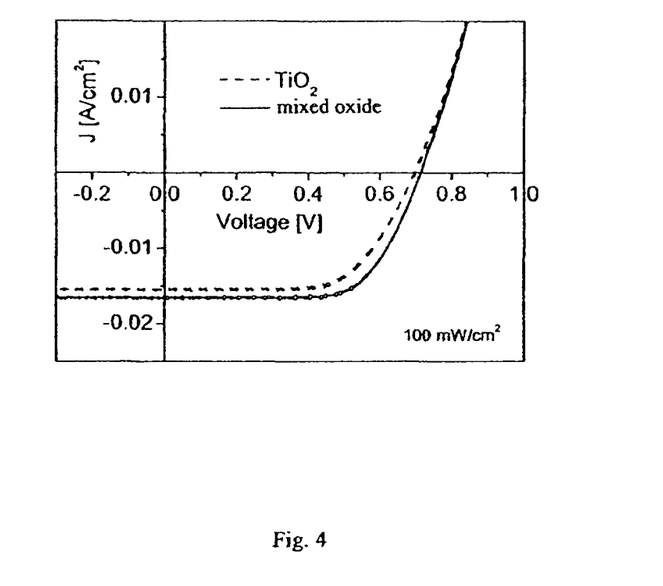
FIG. 4 shows the current density as a function of voltage for cells measured under illumination with white light (100 nmW/cm$^2$). The mixed oxide layer (x=0.99, $Ti_{0.99} Zr_{0.01} O_2$) shows higher open circuit voltage and higher short current density. As a result, the power conversion efficiency is higher than for a "pure" oxide ($TiO_2$).
Figure 5:
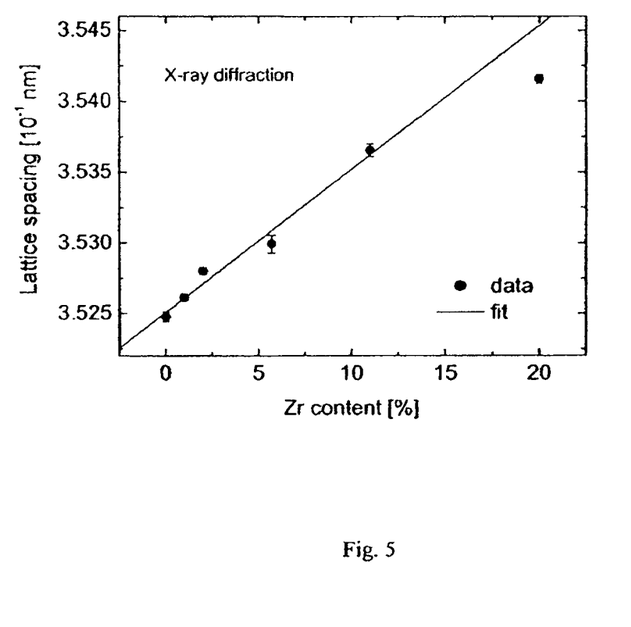
FIG. 5 shows the lattice spacing of a mixed oxide as a function of Zr content.
Figure 6:
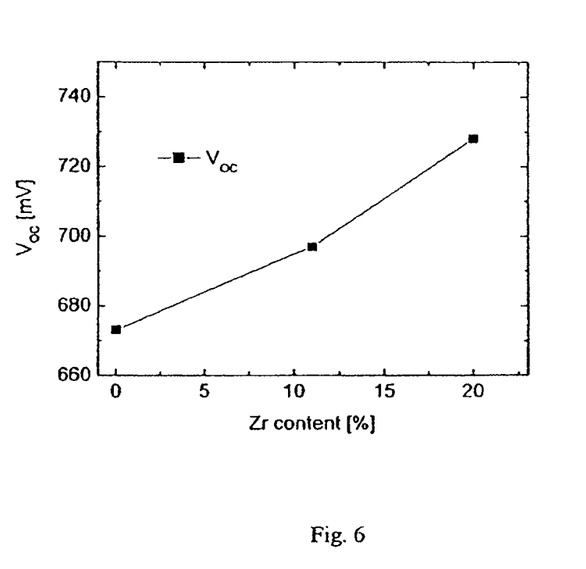
FIG. 6 shows the current open circuit voltage of DSSCs as a function of Zr content.

By means of UV-vis spectroscopy it could be shown that using Ti and Zr in a mixed oxide leads to an increased band gap when compared to the pure $TiO_2$ since $ZrO_2$ has a larger band gap. The absorption of a porous film of mixed oxide with an atomic ratio of Zr:Ti=1:4 is depicted in FIG. 3 together with the absorption of a pure $TiO_2$ material. To correctly account for direct transmitted and scattered light, the measurement has been done with the help of an integrating sphere. Comparison between the mixed oxide and the pure $TiO_2$ clearly shows the onset of the absorption of the mixed oxide to be at shorter wavelengths indicating a larger band gap of the mixed oxide. In FIG. 5, the lattice spacing as obtained by X-ray diffraction is shown as a function of Zr content. The continuous increase proved that a new material/compound rather than a mixture of two materials has been produced. When measuring I-V-characteristics of cells with this mixed oxide, they show indeed an increased $V_{OC}$ as illustrated in FIG. 6. It can be seen that $V_{OC}$ increases as the Zr content increases in comparison to pure $TiO_2$. However, the conduction band edge can be too high for an effective injection of electrons into the conduction band, depending on the dye molecule and band edge shift. This is indeed the case for the dye molecules used in the present case of the 1:4 ratio of Zr and Ti. Reduced Zr content however leads to an increase of both $V_{OC}$ and $I_{SC}$ as shown in FIG. 4. As a consequence, the overall power conversion efficiency was improved from η=7.1% for the reference cell to η=8.0% for the cell based on the mixed oxide with a content of 1% Zr (measured at 100 mW/cm$^2$, irradiated area was 0.25 cm$^2$).

Scheme for Preparing Mixed Oxides and Solar Cells:

Mixed oxides were prepared either by means of a post treatment of the pre-sintered porous $TiO_2$ layers or by the synthesis of mixed oxides by means of thermal hydrolysis using at least two different precursor molecules.

A general synthetic route for the synthesis of mixed oxides can be described as follows: x mole of zirconium isopropoxide, $Zr(^iPrO)_4$ were mixed with (1−x) mole of titanium isopropoxide, $Ti(^iPrO)_4$. The mixture was poured under continuous stirring into a beaker containing distilled water. The resulting milky mixed oxide suspension was heated up at 80° C. in the presence of $HNO_3$ 0.1 M. Finally the mixture was poured into a teflon inlet inside a reactor and heated up at 240° C. for 12 hours. The reaction conditions were adjusted to give the required average particle size and a homogeneous distribution of the compounds in the particles.

The DSSC are assembled as follows: A 30-nm-thick bulk $TiO_2$ blocking layer is formed on FTO (approx. 100 nm on glass). A 10-μm-thick porous layer of semiconductor particles is screen printed on the blocking layer and sintered at 450° C. for half an hour. If the mixed oxide is formed by means of a post treatment of the first material, the porous layer, which might be, e.g., $TiO_2$, is immersed in, e.g., $ZrO(NO_3)_2$ for 1 h. The layer is then again sintered at 450° C. for 30 min. As a result, the Zr ions are penetrated into the $TiO_2$ material and have replaced some of the Ti ions and a mixed oxide is formed which is not just a core-shell-structure as described in Diamant et al, but wherein Zr has replaced Ti throughout the semiconductor layer. As a second possibility, the mixed oxide from the synthesis described above can be used directly for preparation of the porous layers.

Red-dye-bis-TBA molecules were adsorbed to the particles via self-assembling out of a solution in ethanol (0.3 mM) and the porous layer was filled with electrolyte containing $I^-/I_3^-$ as redox couple (15 mM). A reflective platinum back electrode was attached with a distance of 6 μm from the porous layer.

The improvement in efficiency of a mixed oxide DSSC in comparison to a DSSC based on $TiO_2$ only is 12.7% (8.0% vs. 7.1%).

The features of the present invention disclosed in the specification, the claims and/or in the accompanying drawings, may, both separately, and in any combination thereof, be material for realizing the invention in various forms thereof.

The invention claimed is:

1. A method of optimizing positions of a conduction band and a valence band and/or the energy difference between a conduction band and a valence band of a semiconductor material in a semiconductor layer of a photoactive device, and of optimizing an open circuit voltage of said device, using a resultant semiconductor compound having at least a ternary formula $A_xB_{1-x}C_y$, wherein one of A and B is a metalloid and the other is a metal or a metalloid, and wherein C is a non-metal or a metalloid, and wherein x is in the range of from 0.001 to 0.999 and y is in the range of from 0.1 to 10 wherein:
said resultant semiconductor compound is synthesized starting from at least two precursor compounds, which are isopropoxides of the general formulae $A_u(iPrO)_w$ and $B_s(iPrO)_t$, wherein said other of A and B is a metal or metalloid selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, and $SrCu_2$, and s, u, t and w are in the range of from 1 to 10, and (iPrO) is an isopropoxide-group.

2. A method of optimizing positions of a conduction band and a valence band and/or the energy difference between a conduction band and a valence band of a semiconductor material in a semiconductor layer of a photoactive device, and of optimizing an open circuit voltage of said device, using a resultant semiconductor compound having at least a ternary formula $A_xB_{1-x}C_y$, wherein one of A and B is a metalloid, and the other is a metal or metalloid, and wherein C is a non-metal or a metalloid, wherein x is in the range of from 0.001 to 0.999 and y is in the range of from 0.1 to 10, wherein:
said resultant semiconductor compound is synthesized starting from an oxide, $AO_m$, and a nitrate, $B(NO_3)_q$, said other of A and B is a metal or metalloid selected from the group comprising Zr, Ti, Hf, V, Ta, Cr, Mo, W, Mn, Fe, Ru, Os, Co, Rh, Ir, Ni, Sn, Nb, Zn, Ag, Pt, Ce, Ge, As, Ga, Si, Al, Cu, CuAl, CuNi, PbZr, SrTi, BaZr, and $SrCu_2$, and m and q being in the range of from 0.1 to 10, wherein said oxide and said nitrate have been reacted together.

3. The method according to claim 1,
wherein C is O,
wherein said resultant semiconductor compound has an upper edge of a valence band and a lower edge of a conduction band,
wherein said upper edge of said valence band is between an upper edge of a valence band of a first semiconductor compound $AC_v$ and an upper edge of a valence band of a second semiconductor compound $BC_z$,
wherein said lower edge of said conduction band of said resultant semiconductor compound is between a lower edge of a conduction band of said first semiconductor compound $AC_v$ and a lower edge of a conduction band of said second semiconductor compound $BC_z$,
wherein v and z are in the range of from 0.1 and 10,
wherein y in said resultant semiconductor compound having the formula $A_xB_{1-x}C_y$ is $y=(1-x)*z+x*v$, and
wherein components A, B, and C in $AC_v$ and $BC_z$ correspond to components A, B, and C in $A_xB_{1-x}C_y$.

4. The method according to any one of the foregoing claims, wherein said one of A and B is a metalloid selected from the group comprising Ge, Si, As, B, Se, Sb, Te and Po.

5. The method according to claim 1 or 2, wherein C is O, said resultant semiconductor compound thus being a mixed semiconductor oxide.

6. The method according to claim 1 or 3 wherein said resultant semiconductor compound is synthesized starting from three, four or more different precursor compounds.

7. The method according to claim 3, wherein one of $AC_v$ and $BC_z$ is $SiO_2$ and the other of $AC_v$ and $BC_z$ is independently selected from the group comprising $TiO_2$, $SnO_2$, ZnO, $Nb_2O_5$, $ZrO_2$, $CeO_2$, $WO_3$, $Cr_2O_3$, $CrO_2$, $CrO_3$, $SiO_2$, $Fe_2O_3$, CuO, $Al_2O_3$, $CuAlO_2$, $SrTiO_3$, $SrCu_2O_2$, $ZrTiO_4$.

8. The method according to any one of the claims 1 to 3, wherein A and B are present in said resultant semiconductor compound in a ratio of from 1:1000 to 1000:1.

9. The method according to claim 2, wherein, after said oxide and said nitrate have been reacted together, a resulting product thereof is sintered.

10. The method according to claim 1 or 3, wherein said resultant semiconductor compound is synthesized by a process comprising:
mixing and reacting said at least two precursor molecules,
heating a mixture resulting from said mixing and reacting, to a temperature between 50° C. and 300° C., for a period of time between 1 h and 20 h,
filtering a product resulting from said heating to obtain said resultant semiconductor compound as a residue, and
sintering the resulting product of said filtering, at a temperature >300° C., for a period of 10 minutes to 60 minutes.

11. The method according to any one of the claims 1 to 3, wherein said resultant semiconductor compound is incorporated in said semiconductor layer of said device as semiconductor particles having an average diameter ≤1 μm.

12. The method according to claim 11, wherein said semiconductor particles have an outer shell made of the same resultant semiconductor compound and/or a further semiconductor compound.

13. The method according to claim 11, wherein said semiconductor particles have a shape selected from the group comprising rods, tubes, cylinders, cubes, parallelipeds, spheres, balls and ellipsoids.

14. The method according to claim 11, wherein said semiconductor particles are a mixture of at least two kinds of particles differing in their average diameter or length, and/or differing in their composition.

15. The method according to claim 11, wherein said semiconductor particles are a mixture of a first kind of particles and a second kind of particles, said first kind of particles having an average diameter or length in the range of from 1 nm to 30 nm, and said second kind of particles having an average diameter in the range of from 50 nm to 500 nm and/or length in the range of from 50 nm to 5 µm.

16. The method according to claim 11,
wherein said resultant semiconductor compound is incorporated in said semiconductor layer of said device as semiconductor particles
wherein said semiconductor particles are a mixture of a first kind of particles and a second kind of particles, and
wherein said first kind of semiconductor particles and said second kind of semiconductor particles are of a same size or are of different size.

17. The method according to any one of the claims 1 to 3, wherein said semiconductor layer has pores having a diameter in the range ≤1 µm.

18. The method according to any one of the claims 1 to 3,
wherein said resultant semiconductor compound is incorporated in said semiconductor layer of said device as semiconductor particles, and
wherein said semiconductor particles, during manufacturing of said device, are applied via screen printing, doctor blading, drop casting, spin coating, inkjet printing, electrostatic layer-by-layer self-assembly, lift-off-process, mineralization process or anodic oxidation.

19. The method according to claim 1,
wherein C is O, and
wherein said semiconductor material is chosen such that it has an upper edge of a conduction band below or equal to a photo-excited state of said dye in the semiconductor layer to allow electron injection from said dye into said conduction band upon photo-excitation of said dye, the upper edge of the conduction band of said semiconductor material being between respective upper edges of conduction bands of a first semiconductor compound $AC_v$ and a second semiconductor compound $BC_z$, and
wherein components A, B, and C in $AC_v$ and $BC_z$ correspond to components A, B, and C in $A_xB_{1-x}C_y$.

20. The method according to any one of the claims 1 to 3, wherein said optimizing is a widening or narrowing of said energy difference between said conduction band and said valence band of said semiconductor material or is a shift in the position of a band gap between said conduction band and said valence band.

21. The method according to claim 1, wherein said optimizing is with respect to a photoexcited state of said dye in the semiconductor layer, so as to enable electron injection from said photoexcited state into said conduction band of said semiconductor material, and is furthermore with respect to the redox potential of a redox couple present in said dye-sensitised solar cell (DSSC).

22. The method according to claim 1, wherein said device is a dye-sensitised solar cell having a dye in said semiconductor layer.

23. The method according to claim 2, wherein said device is a dye-sensitised solar cell having a dye in said semiconductor layer.

24. The method according to claim 2,
wherein C is O,
wherein said resultant semiconductor compound has an upper edge of a valence band and a lower edge of a conduction band,
wherein said upper edge of said valence band is between an upper edge of a valence band of a first semiconductor compound $AC_v$ and an upper edge of a valence band of a second semiconductor compound $BC_z$,
wherein said lower edge of said conduction band of said resultant semiconductor compound is between a lower edge of a conduction band of said first semiconductor compound $AC_v$ and a lower edge of a conduction band of said second semiconductor compound $BC_z$,
wherein v and z are in the range of from 0.1 and 10,
wherein y in said semiconductor compound having the formula $A_xB_{1-x}C_y$ is $y=(1-x)*z+x*v$, and
wherein components A, B, and C in $AC_v$ and $BC_z$ correspond to components A, B, and C in $A_xB_{1-x}C_y$.

25. The method according to claim 10, wherein said heating the mixture resulting from said mixing and reacting is conducted in the presence of an acid.

26. The method according to claim 10, wherein the sintering the resulting product of said filtering is conducted at a temperature >400° C. for approximately 30 minutes.

27. The method according to claim 17, wherein said semiconductor layer has pores having a diameter in the range from 1 nm to 500 nm.

28. The method according to claim 27, wherein said semiconductor layer has pores having a diameter in the range from 10 nm to 50 nm.

29. The method according to claim 2, wherein said oxide and said nitrate are nitrated together by mixing.

30. The method according to claims 1 or 2, wherein C is selected from the group comprising C, N, O, P, S, Se, As, $NO_2$, $NO_3$, $SO_3$, $SO_4$, $PO_4$, $PO_3$, and $CO_3$.

31. The method according to claim 9, wherein the resulting product is sintered at T>300° C.

32. The method according to claim 12, wherein said further semiconductor compound is a semiconductor oxide.

33. The method according to any one of the claims 1 or 2, wherein said one of A and B is a metalloid selected from the group comprising Ge, Si, and As.

* * * * *